United States Patent
Fan

(12) United States Patent (10) Patent No.: US 6,213,819 B1
Fan (45) Date of Patent: Apr. 10, 2001

(54) DETACHABLE FAN RACK FOR COMPUTER

(75) Inventor: Cheng-Yuan Fan, Taoyuan Hsien (TW)

(73) Assignee: Enlight Corporation, Taoyuan Hsien (TW)

( * ) Notice: Subject to any disclaimer, the term of this patent is extended or adjusted under 35 U.S.C. 154(b) by 0 days.

(21) Appl. No.: 09/589,762

(22) Filed: Jun. 9, 2000

(51) Int. Cl.$^7$ .................................................. H01R 13/73
(52) U.S. Cl. .............................. 439/894; 361/695; 439/61
(58) Field of Search .............................. 439/894, 61, 296, 439/297, 298, 487; 361/683, 688, 690, 692, 693, 694, 695

(56) References Cited

U.S. PATENT DOCUMENTS

| | | | |
|---|---|---|---|
| 5,136,468 | * 8/1992 | Wong et al. | 439/61 |
| 5,337,464 | * 8/1994 | Steffes | 439/61 |
| 5,562,410 | * 10/1996 | Sachs et al. | 415/213.1 |
| 5,636,103 | * 6/1997 | Buschner | 361/695 |
| 5,788,467 | * 10/1999 | Zenitani et al. | 417/360 |
| 5,854,736 | * 12/1998 | Bowler | 361/695 |
| 5,973,921 | * 10/1999 | Lin | 361/695 |

\* cited by examiner

Primary Examiner—Tulsidas Patel
(74) Attorney, Agent, or Firm—Dougherty & Troxell

(57) ABSTRACT

A detachable fan rack includes a mounting frame, and a fan holder, the mounting frame having a receiving opening, a plurality of hook holes, a plug hole, a locating notch and a plug hole spaced around the center opening, the fan holder being mounted on the mounting frame to hold a fan in the center opening on the mounting frame, the fan holder including a holder base and a locking plate, the holder base having bottom mounting legs respectively hooked in the hook holes on the mounting frame, a plug mount holding an electric plug, a clamping plate clamped on the retaining portion at the mounting frame, a hook at one side, and a positioning member positioned in the locating notch on the mounting frame, the locking plate being coupled to the holder base at one side and turned between a first position where the locking plate is engaged into the plug hole on said mounting frame and hooked up with the hook at the holder base to lock the fan holder, and a second position where the locking plate is disengaged from the plug hole and the hook for enabling the fan holder to be disconnected from the mounting frame.

1 Claim, 7 Drawing Sheets

DETACHABLE FAN RACK FOR COMPUTER

BACKGROUND OF THE INVENTION

The present invention relates to a fan rack for computer, and more particularly to a detachable fan rack that enables the user to replace the fan without cutting power supply from the computer.

A computer has a fan rack holding at least one fan for dissipation of heat. The power circuit of each fan is welded to the power circuit of the computer to obtain the necessary working voltage from the computer. In case one fan fails, the power circuit of the computer must be turned off so that the failed fan can be disconnected from the fan rack for a repair work or replacement without causing damage to the internal circuit of the computer. However, a big loss may occur when cutting off power supply from a computer been used in an industrial or financial place to run a control or to provide a service.

SUMMARY OF THE INVENTION

It is the main object of the present invention to provide a fan rack for computer, which enables the user to replace the fan (or fans) without cutting off power supply from the computer in which the fan rack is installed. According to the present invention, the fan rack comprises a mounting frame, and a fan holder. The mounting frame comprises a receiving opening, a plurality of hook holes, a plug hole, a locating notch and a plug hole spaced around the center opening. The fan holder is mounted on the mounting frame to hold a fan in the center opening on the mounting frame, comprising a holder base and a locking plate. The holder base comprises bottom mounting legs respectively hooked in the hook holes on the mounting frame, a plug mount holding an electric plug, a clamping plate clamped on the retaining portion at the mounting frame, a hook at one side, and a positioning member positioned in the locating notch on the mounting frame. The locking plate is coupled to the holder base at one side and turned between a first position where the locking plate is engaged into the plug hole on the mounting frame and hooked up with the hook at the holder base to lock the fan holder, and a second position where the locking plate is disengaged from the plug hole and the hook for enabling the fan holder to be disconnected from the mounting frame.

DETAILED DESCRIPTION OF THE PREFERRED EMBODIMENT

Figure 1:
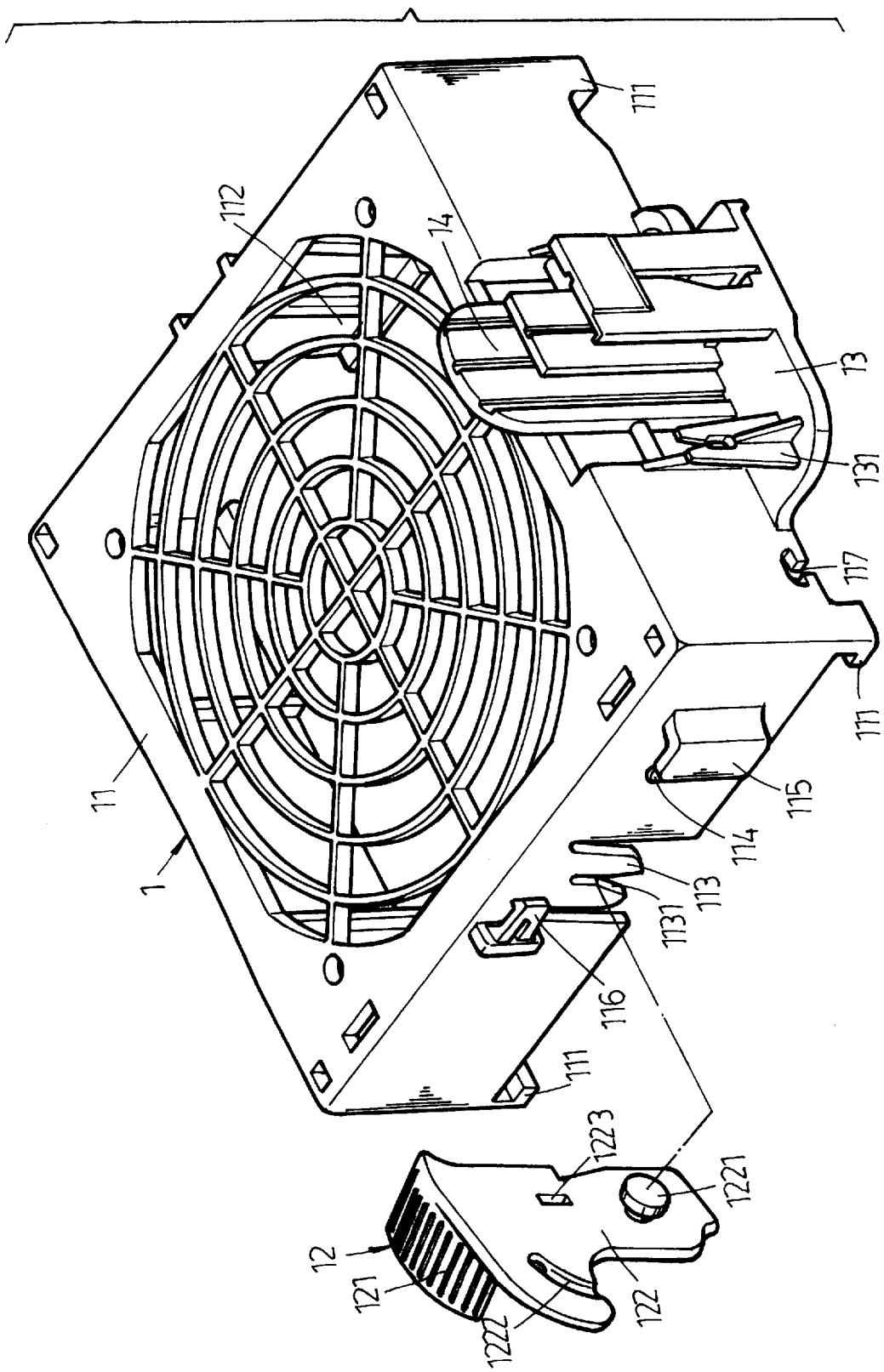
FIG. 1 is an exploded view of a fan holder for a detachable fan rack according to the present invention.
Figure 2:
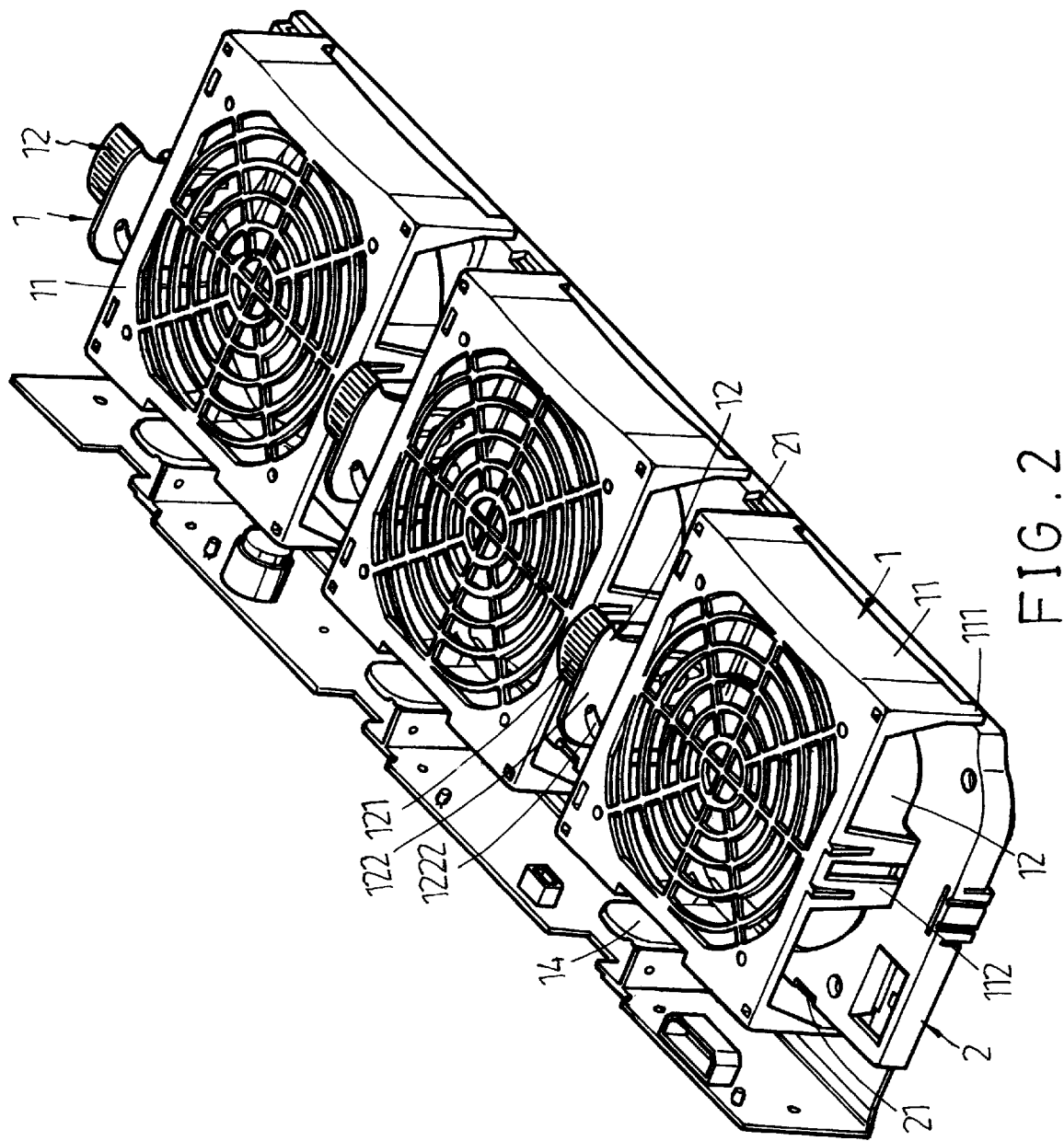
FIG. 2 is a perspective view of the present invention, showing the fan holders installed in the mounting frame.

Referring to FIGS. From 1 through 3, a detachable fan rack in accordance with the present invention comprises a plurality of fan holders 1 holding a respective fan, and a mounting frame 2. Each fan holder 1 comprises a holder base 11, a locking plate 12, a plug mount 13, and a springy clamping plate 14. The holder base 11 comprises four L-shaped mounting legs 111 disposed in four corners thereof, a positioning member 112 vertically downwardly suspended at one side, a plug plate 113 vertically downwardly disposed at one side opposite to the positioning member 112, a raised portion 114 and a hook 116 spaced from the plug plate 113 at two opposite lateral sides, and a stop plate 115 disposed adjacent to the raised portion 114. The plug plate 113 has a downwardly extended coupling notch 1131. The locking plate 12 comprises a base 122 and a finger strip 121 extended from one side of the base 122. The base 122 comprises a bolt 1221 coupled to the coupling notch 1121 on the plug plate 113, a guide groove 1222 coupled to the raised portion 114, and a lock hole 1223. The locking plate 12 is coupled to the plug plate 113. The plug mount 13 is fastened to one side of the holder base 11 opposite to the locking plate 12 to hold an electric plug, comprising a wire clip 131 for securing lead out wires that extend out of a wire hole 117 on the holder base 11 and connected to a circuit board for electric plug being secured to the plug mount 13 by the springy clamping plate 14.

Figure 3:
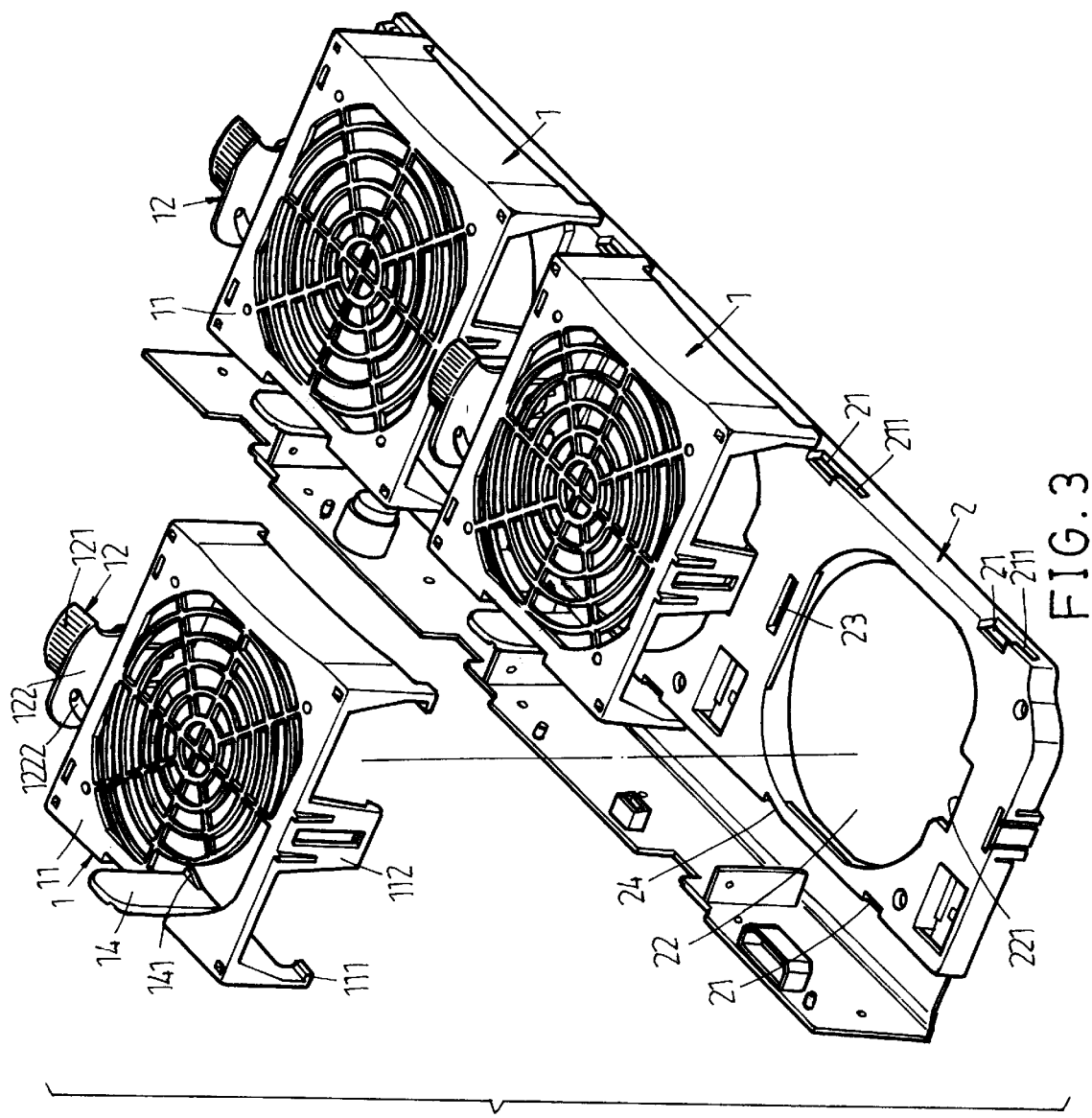
FIG. 3 is an exploded view of FIG. 2.
Figure 4:
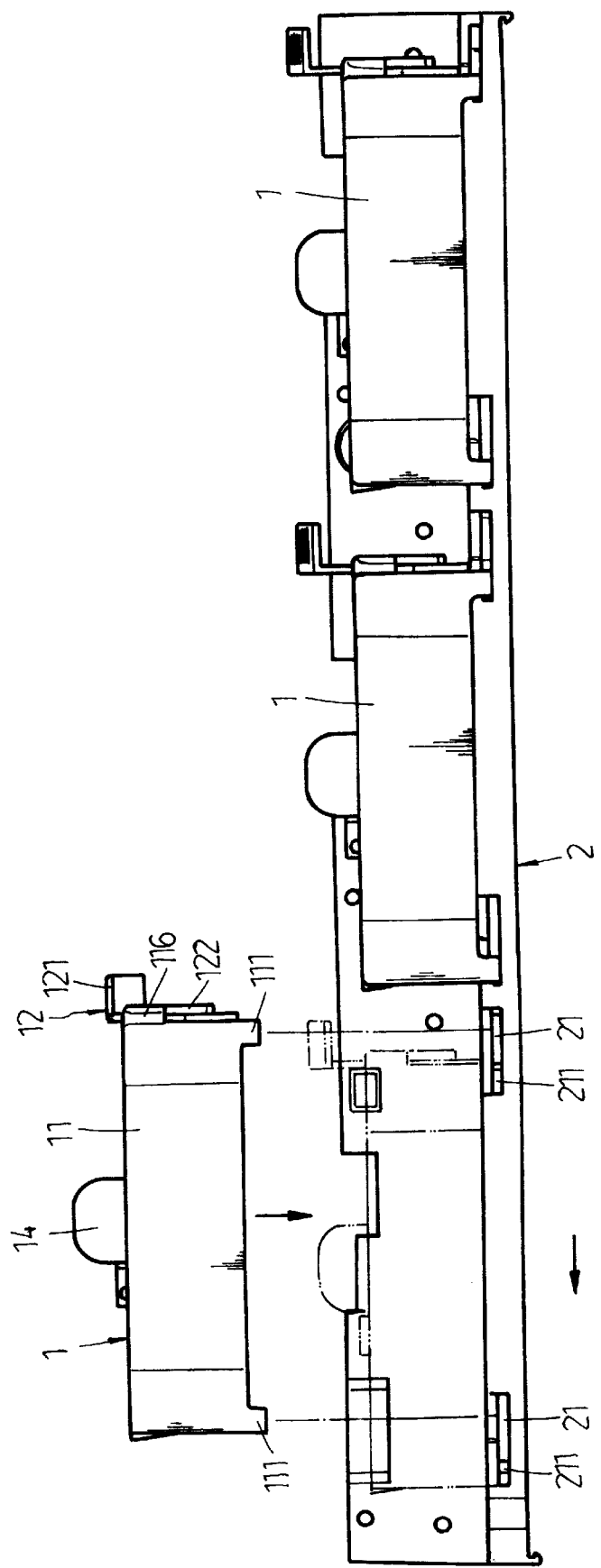
FIG. 4 is a side plain view of FIG. 3.

Referring to FIGS. 3 and 4, the mounting frame 2 comprising a plurality of fan holder positioning structures for the positioning of the fan holders 1. Each fan holder positioning structure comprises a receiving opening 22, which receives one fan holder 1, a locating notch 221 at the periphery of the receiving opening 22 for the positioning of the positioning member 112 of the corresponding fan holder 1, a plug hole 23 for receiving the base 122 of the locking plate 12, a retaining portion 24 for engagement with the clamping plate 14 of the corresponding fan holder 1, and a plurality of positioning notches 21 spaced around the receiving opening 22 and defining a respective hook hole 211 for engagement with the L-shaped mounting legs 111 of the corresponding fan holder 1.

Referring to FIGS. 3 and 4 again, when mounting one fan holder 1 in the L-shaped mounting legs 111 are respectively inserted into the positioning notches 21 and engaged into the hook hole 211 in each positioning notch 21, and at the same time the positioning member 112 of the fan holder 1 is positioned in the locating notch 221, and a tongue 141 of the clamping plate 14 is forced into engagement with the retaining portion 24.

Figure 5:
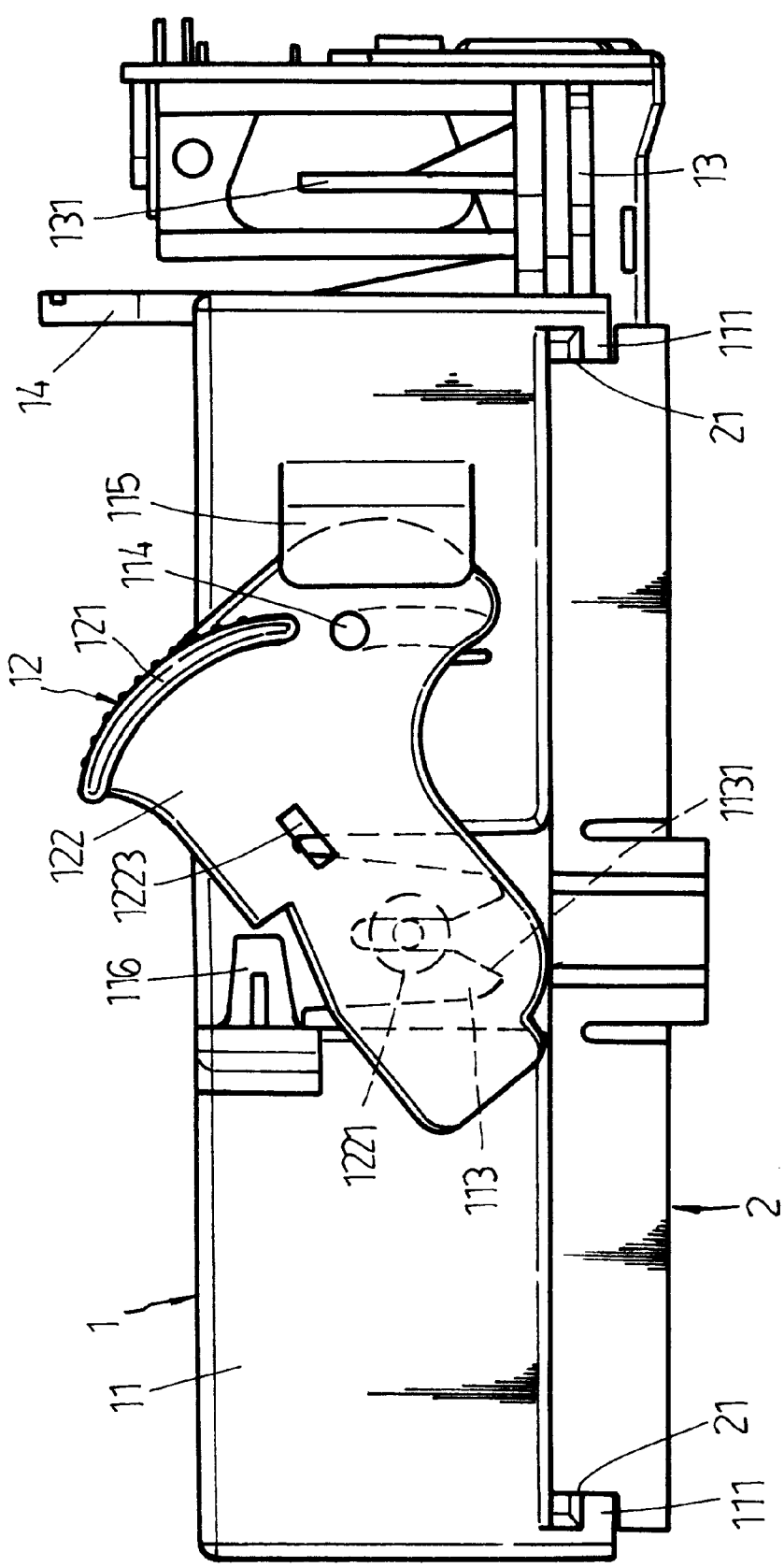
FIG. 5 is a side plain view of a part of the detachable fan rack according to the present invention showing the locking plate unlocked.
Figure 6:
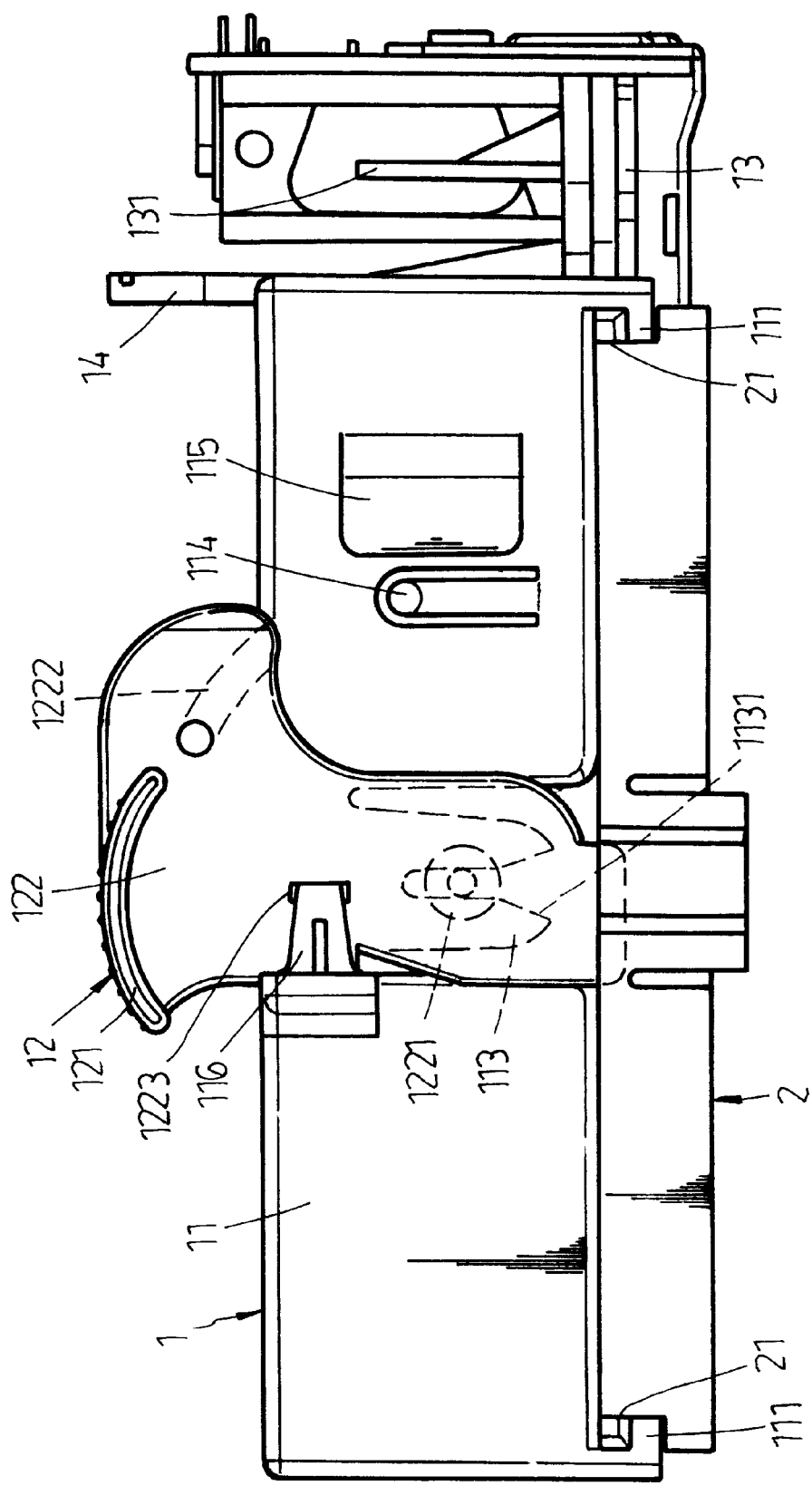
FIG. 6 is similar to FIG. 5 but showing the locking plate locked.

Referring to FIGS. 5 and 6, after mounting of one fan holder 1 in the mounting frame 2, the locking plate 12 is turned between the unlocking position where the base 122 of the locking plate 12 is stopped at the stop plate 115, and a locking position where the base 122 of the locking plate 12 is engaged into the plug hole 23 of the corresponding fan holder positioning structure and the lock hole 1223 is forced into engagement with the hook 116 at the holder base 11 of the corresponding fan holder 1.

Figure 7:
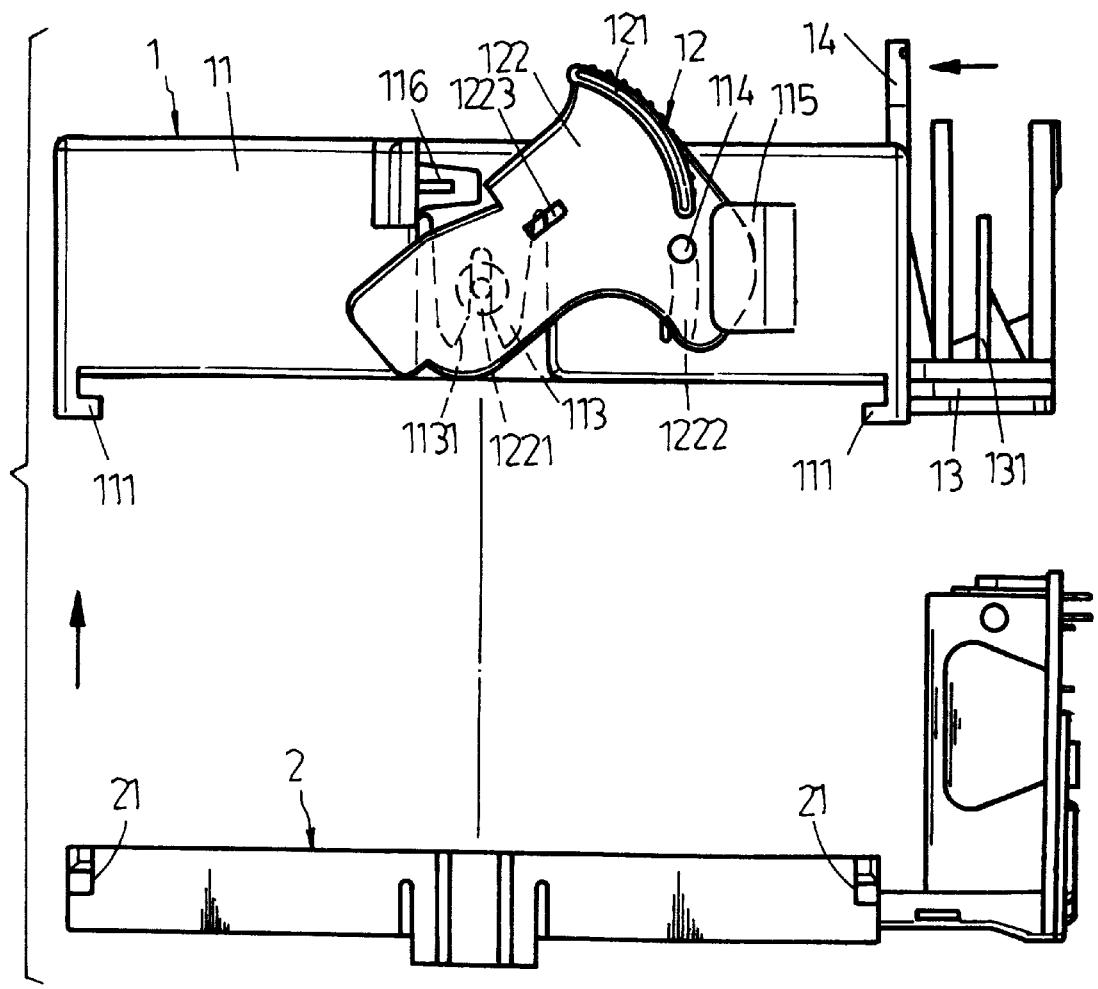
FIG. 7 is a plain view of a part of the present invention, showing the fan holder disconnected from the mounting frame.

Referring to FIG. 7, when replacing the fan in one fan holder 1, the locking plate 12 is turned from the locking position to the unlocking position to disengage the lock hole 1223 from the hook 116m and then the clamping plate 14 is pushed to disengage the tongue 141 from the retaining portion 24, enabling the holder base 11 to be disconnected from the mounting frame 2 for replacement of the fan.

While only one embodiment of the present invention has been shown and described, it will be understood that various modifications and changes could be made thereunto without departing from the spirit and scope of the invention disclosed.

What the invention claimed is:

1. A detachable fan rack comprising:

a mounting frame, said mounting frame comprising a receiving opening, a locating notch at the periphery of said receiving opening, a plug hole disposed adjacent to said receiving hole at one side opposite to said locating notch, a retaining portion, and a plurality of positioning notches spaced around said receiving opening, and a plurality of hook holes respectively defined in said positioning notches; and a fan holder detachably mounted on said mounting frame to hold an electric fan in said receiving opening, said fan holder comprising a holder base, a plug mount fixedly provided at one side of said holder base to hold an electric plug, a clamping plate installed in said plug mount, and a locking plate coupled to said holder base for locking said holder base after installation of said holder base in said mounting frame, said holder base comprising a plurality of mounting legs respectively inserted into said positioning notches and engaged into said hook holes, positioning member vertically downwardly suspended at one side and coupled to the locating notch on said mounting frame, a plug plate vertically downwardly disposed at one side opposite to said positioning member and positioned in the locating notch on said mounting frame, a raised portion and a hook spaced from said plug plate at two opposite lateral sides, and a stop plate disposed adjacent to said raised portion, said plug plate having a downwardly extended coupling notch, said locking plate comprising a base, and a finger strip formed integral with one side of the base of said locking plate, the base of said locking plate comprising a bolt coupled to the coupling notch on said plug plate for enabling said locking plate to be turned between a first position where the base of said locking plate is engaged into the plug hole on said mounting frame and a second position where the base of said locking plate is disengaged from the plug hole on said mounting frame and stopped at said locating plate, a guide groove coupled to said raised portion to guide turning of said locking plate between said first position and said second position, and a lock hole for engagement with said hook when said locking plate is moved to said first position, said springy clamping plate having a tongue forced into engagement with the retaining portion at said mounting frame.

* * * * *